US010946309B2

(12) United States Patent
Jagger et al.

(10) Patent No.: US 10,946,309 B2
(45) Date of Patent: *Mar. 16, 2021

(54) LIQUID-LIQUID MASS TRANSFER PROCESS AND APPARATUS

(71) Applicant: Merichem Company, Houston, TX (US)

(72) Inventors: John Jagger, Houston, TX (US); Chaitanya Sathaiah Vudutha, Houston, TX (US); Raj Nagarajan, Houston, TX (US)

(73) Assignee: Merichem Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,856

(22) Filed: Sep. 23, 2019

(65) Prior Publication Data

US 2020/0171408 A1 Jun. 4, 2020

Related U.S. Application Data

(63) Continuation of application No. 16/203,967, filed on Nov. 29, 2018, now Pat. No. 10,456,711.

(51) Int. Cl.
*B01D 11/04* (2006.01)
*C10G 19/00* (2006.01)
(Continued)

(52) U.S. Cl.
CPC ...... *B01D 11/0449* (2013.01); *B01D 11/0453* (2013.01); *B01D 63/02* (2013.01);
(Continued)

(58) Field of Classification Search
CPC ..... B01J 4/00; B01J 4/001; B01J 4/002; B01J 14/00; B01J 19/24; B01J 19/2415;
(Continued)

(56) References Cited

U.S. PATENT DOCUMENTS

| 3,342,729 A | 9/1967 | Strand |
| 3,754,377 A | 8/1973 | Clonts |

(Continued)

FOREIGN PATENT DOCUMENTS

| CN | 201768556 | 3/2011 |
| CN | 203999512 | 12/2014 |
| CN | 205109606 | 3/2016 |

OTHER PUBLICATIONS

ISA Search Report for PCT Application No. PCT/US2019/052584 dated Dec. 29, 2019.

(Continued)

*Primary Examiner* — Joseph W Drodge
(74) *Attorney, Agent, or Firm* — C. Tumey Law Group PLLC

(57) ABSTRACT

A fiber bundle contactor may include a vessel including a first inlet; a second inlet; a mixing zone arranged in the vessel to receive a first fluid from the first inlet and a including fluid from the second inlet, wherein the mixing zone comprises a perforated plate assembly comprising a plate, a plurality of openings in the plate, and a plurality of riser pipes that extend from the plate and arranged to allow fluid flow through additional openings in the plate; and an extraction zone including a fiber bundle arranged in the vessel to receive the first fluid and the second fluid from the mixing zone.

20 Claims, 9 Drawing Sheets

(51) Int. Cl.

| | |
|---|---|
| *B01D 63/02* | (2006.01) |
| *B01D 69/08* | (2006.01) |
| *B01J 19/24* | (2006.01) |
| *B01F 5/02* | (2006.01) |
| *B01J 4/00* | (2006.01) |
| *B01F 15/02* | (2006.01) |
| *C10G 19/02* | (2006.01) |

(52) U.S. Cl.
CPC ............ *B01D 69/08* (2013.01); *B01F 5/0275* (2013.01); *B01F 15/02* (2013.01); *B01F 15/0201* (2013.01); *B01J 4/00* (2013.01); *B01J 4/001* (2013.01); *B01J 19/2475* (2013.01); *C10G 19/02* (2013.01); *B01D 2313/10* (2013.01); *B01J 2219/00891* (2013.01)

(58) Field of Classification Search
CPC .................. B01J 19/2475; B01J 19/248; B01J 2219/00599; B01J 2219/00085; B01J 2219/00889; B01J 2219/00891; B01J 2219/00894; B01J 2219/00896; B01J 2219/00907; B01J 2219/24; B01J 2219/2401; B01J 2219/2418; B01J 2219/2419; B01J 2219/2422; B01J 2219/2423; B01J 2219/2424; B01J 2219/2475; B01J 2219/3322; B01D 11/00; B01D 11/04; B01D 11/0415; B01D 11/0449; B01D 11/0453; B01D 63/02; B01D 63/024; B01D 63/025; B01D 63/026; B01D 63/027; B01D 63/04; B01D 69/00; B01D 69/02; B01D 69/08; B01D 2201/44; B01D 2239/04; B01D 2239/4014; B01D 2239/0421; B01D 2239/0428; B01D 2239/0464; B01D 2239/0471; B01D 2239/0478; B01D 2239/0492; B01D 2239/065; B01D 2311/04; B01D 2311/26; B01D 2311/263; B01D 2311/2634; B01D 2311/2638; B01D 2311/2696; B01D 2313/04; B01D 2313/10; B01D 2313/90; B01D 11/0429; B01D 17/02; B01D 17/0208; B01D 17/0214; B01D 71/00; B01D 71/06; B01D 71/26; B01D 71/28; B01D 71/30; B01D 71/32; B01D 71/34; B01D 71/36; B01D 71/38; B01D 71/40; B01D 71/42; B01D 71/44; B01D 71/46; B01D 71/48; B01D 71/50; B01D 71/52; B01D 71/54; B01D 71/56; B01D 71/58; B01D 71/60; B01D 71/62; B01D 71/64; C10G 19/02; C10G 21/20; C11C 3/04; C11C 3/10; C10L 1/026; C10L 2200/0476; C10L 2270/026; C07C 41/14; C07C 41/16; C07C 67/03; C07D 301/28; B01F 3/0861; B01F 3/0865; B01F 3/088; B01F 3/2253; B01F 3/2261; B01F 5/00; B01F 5/0057; B01F 5/0068; B01F 5/02; B01F 5/0275; B01F 5/0281; B01F 5/04; B01F 5/0401; B01F 5/0403; B01F 5/0413; B01F 5/0418; B01F 5/0421; B01F 15/02; B01F 15/0201; B01F 15/0227; B01F 15/06; B01F 15/0601; B01F 15/0602; B01F 15/0682; B01F 2005/0088; B01F 2005/0091; B01F 2005/0094; B01F 2005/0431; B01F 2005/0433; B01F 2005/0443; B01F 2005/0448; B01F 2215/0036; B01F 5/0082; B01F 5/0466; B01F 5/0463; B01F 5/0451; B01F 5/0461
USPC ...... 210/511, 321.8, 321.88, 321.89, 500.23, 210/634, 638, 644, 749, 806; 44/307, 44/308, 436, 451, 452, 605, 629; 422/198, 608, 616–618, 211, 212; 585/14; 554/20, 21, 167–173, 175; 549/514; 568/630

See application file for complete search history.

(56) References Cited

U.S. PATENT DOCUMENTS

| | | | |
|---|---|---|---|
| 3,758,404 A | 9/1973 | Clonts | |
| 3,992,156 A | 11/1976 | Clonts | |
| 4,917,798 A * | 4/1990 | Liou | B01D 63/04 210/321.89 |
| 5,705,074 A | 1/1998 | Brient | |
| 5,997,731 A | 12/1999 | Suarez | |
| 7,207,445 B2 | 4/2007 | Manna et al. | |
| 8,128,825 B2 | 3/2012 | Massingill | |
| 9,656,185 B2 | 5/2017 | McGehee et al. | |
| 9,981,864 B2 * | 5/2018 | Sakurai | C02F 1/44 |
| 10,456,711 B1 * | 10/2019 | Jagger | B01J 19/2475 |
| 2003/0141238 A1 | 7/2003 | Herczeg | |
| 2004/0050783 A1 * | 3/2004 | Barnier | B01D 63/024 210/636 |
| 2006/0196831 A1 * | 9/2006 | Vossenkaul | B01D 63/043 210/636 |
| 2009/0062407 A1 | 3/2009 | Iversen et al. | |
| 2009/0194467 A1 * | 8/2009 | Garrett | B07B 1/42 209/365.1 |
| 2012/0304856 A1 * | 12/2012 | Kanetsuki | B01D 63/023 95/47 |
| 2016/0158670 A1 * | 6/2016 | Tanizaki | B41J 2/17563 347/93 |
| 2017/0014733 A1 | 1/2017 | Massingill | |
| 2017/0369790 A1 | 10/2017 | Gomach | |
| 2018/0066896 A1 * | 3/2018 | Lin | H01L 23/427 |
| 2018/0066898 A1 * | 3/2018 | Lin | F28D 15/0233 |

OTHER PUBLICATIONS

Non-Final Office Action for U.S. Appl. No. 16/203,967 dated Mar. 27, 2019.

Notice of allowance for U.S. Appl. No. 16/203,967 dated Jun. 26, 2019.

International Search Report and Written Opinion for Application No. PCT/US2019/052584 dated Jun. 29, 2020.

\* cited by examiner

LIQUID-LIQUID MASS TRANSFER PROCESS AND APPARATUS

BACKGROUND

Chemical processes often require multiple unit operations to produce a particular product stream. A particular unit operation may be a liquid-liquid contacting operation whereby two liquids are brought into intimate contact to effectuate mass transfer between the liquids, a reaction between components in the liquids, or both. Liquid-liquid contacting may be beneficial in some types of chemical reactions where one reactant is miscible in a first liquid but immiscible in a second liquid. An example of such a reaction may be where a first reactant is present in a polar solvent such as water and a second reactant is present in a non-polar solvent such as a hydrocarbon and the water and hydrocarbon are immiscible. Liquid-liquid contacting may have other applications such as liquid-liquid extraction whereby a species present in a first liquid is extracted into a second liquid by mass transfer across the liquid-liquid interface.

A particular challenge of liquid-liquid contacting may be ensuring adequate contact area between the two liquids such that the mass transfer or reactions may occur in an appreciable amount and in an economically viable manner. In general, liquid-liquid contacting operations may be performed with immiscible liquids, such as, for example, an aqueous liquid and an organic liquid. Using two immiscible liquids may allow the liquids to be readily separated after the liquid-liquid contacting is completed. However, when a liquid-liquid contacting operation is performed with immiscible liquids, phase separation may occur before adequate contact between the liquids is achieved.

Several liquid-liquid contacting vessels and techniques have been developed to enhance the contact area between liquids in a liquid-liquid contacting process, including, but not limited to, fiber-bundle type liquid-liquid contactors. A fiber-bundle type liquid-liquid contactor may generally comprise one or more fiber bundles suspended within a shell and two or more inlets where the two liquids may be introduced into the shell. The fiber bundle may promote contact between the two liquids by allowing a first liquid to flow along individual fibers of the fiber bundles and a second liquid to flow between the individual fibers thereby increasing the effective contact area between the liquids. The two liquids may flow from an inlet section of the shell to an outlet section of the shell while maintaining intimate contact such that a reaction, mass transfer, or both may be maintained between the two liquids.

There may exist challenges with designing and operating fiber-bundle type liquid-liquid contactors due to "entrance effects" where the two liquids first come into contact. The degree to which the two liquids are mixed or in contact before they reach the fiber bundle may determine the effectiveness of liquid-liquid contact operation, the length of fiber required, pressure drop, material cost, and other factors apparent to those of ordinary skill in the art. Additionally, as the two liquids flow through the fiber bundle, when oriented vertically, phase separation may begin to occur such that the relatively heavier, or denser, liquid may begin to migrate to the center of the fiber-bundle while the relatively lighter, or less dense, liquid may begin to migrate to the outside of the fiber-bundle. Early phase separation may be a consequence of inadequate distribution of the two liquids before entering the fiber-bundle.

SUMMARY

In an embodiment, a fiber bundle liquid-liquid contactor may comprise a vessel comprising: a first inlet; a second inlet; mixing zone arranged in the vessel to receive a first liquid from the first inlet and a second liquid from the second inlet, wherein the mixing zone comprises an inductor fluidically coupled to the inlet for the second liquid; and an extraction zone comprising a fiber bundle arranged in the vessel to receive the first liquid and the second liquid from the mixing zone. In another embodiment, a fiber bundle liquid-liquid film contactor may comprise: a vessel comprising: a first inlet; a second inlet; a mixing zone arranged in the vessel to receive a first liquid from the first inlet and a second liquid from the second inlet, wherein the mixing zone comprises a spiral distributor fluidically coupled to the inlet for the second liquid; and an extraction zone comprising a fiber bundle arranged in the vessel to receive the first liquid and the second liquid from the mixing zone. In another embodiment, a fiber bundle liquid-liquid film contactor may comprise: a vessel comprising: a first inlet; a second inlet; a mixing zone arranged in the vessel to receive a first liquid from the first inlet and a second liquid from the second inlet, wherein the mixing zone comprises a perforated plate assembly comprising a plate, a plurality of openings in the plate, and a plurality of chimneys that extend from the plate and arranged to allow fluid flow through additional openings in the plate; and an extraction zone comprising a fiber bundle arranged in the vessel to receive the first liquid and the second liquid from the mixing zone

BRIEF DESCRIPTION OF THE DRAWINGS

These drawings illustrate certain aspects of some of the embodiments of the present disclosure, and should not be used to limit or define the disclosure.

DETAILED DESCRIPTION

The present disclosure may relate to liquid-liquid mass transfer devices, and in some embodiments, to liquid-liquid mass transfer devices comprising configurations of inlet features that may reduce entrance effects and promote distribution of liquids. In some embodiments, the liquid-liquid mass transfer devices may comprise a fiber-bundle type liquid-liquid mass transfer device. A fiber-bundle type liquid-liquid mass transfer device may provide non-dispersive phase contact between liquids which may have certain advantages over dispersive mixing mass transfer devices.

Figure 1:
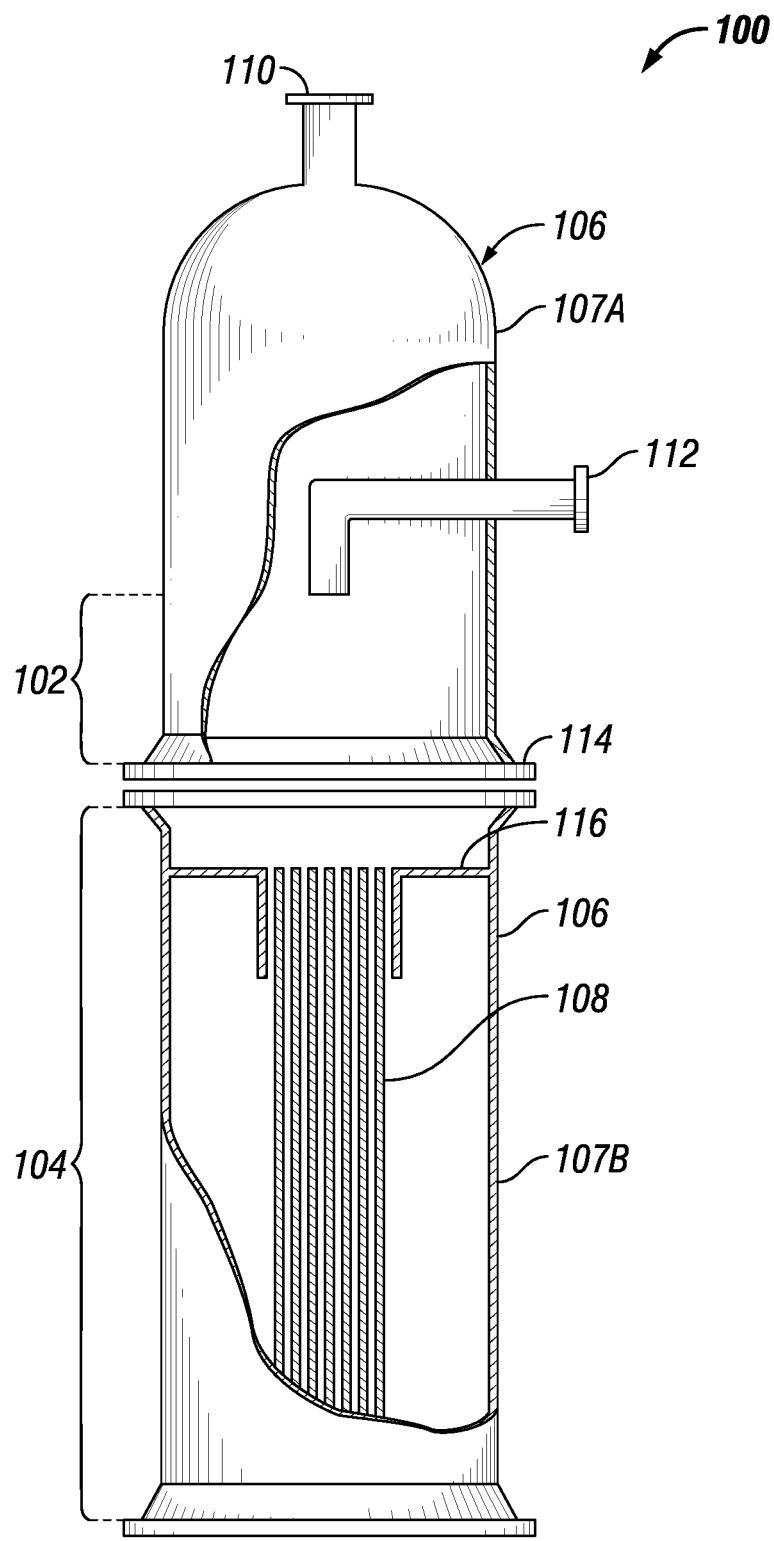
FIG. 1 is a schematic diagram of a liquid-liquid mass transfer device.

FIG. 1 illustrates, in schematic form, an embodiment of a fiber-bundle type liquid-liquid mass transfer device 100. Fiber-bundle type liquid-liquid mass transfer device 100 may comprise vessel 106 which may contain and/or otherwise support equipment and features required for liquid-liquid contacting. As illustrated, vessel 106 may comprise two halves 107a, 107b joined by flange 114 which may provide a mounting point to secure the two halves 107a, 107b of vessel 106 together. Alternatively, vessel 106 may comprise a single continuous vessel (not shown) without flange 114 or may comprise a plurality of pieces (not shown) joined by flanges or otherwise secured together. As illustrated, fiber-bundle type liquid-liquid mass transfer device 100 is oriented in a vertical direction. One of ordinary skill in the art will appreciate that fiber-bundle type liquid-liquid mass transfer device 100 may be oriented in any direction, such as, for example, horizontally, vertically, or any angle in-between. Vessel 106 may comprise various inlets configure to allow liquids to enter into vessel 106. Vessel 106 may comprise a first inlet 110 and a second inlet 112, for example. Although only two inlets are illustrated, one of ordinary skill in the art would understand that any number of inlets may be used for a particular application. Vessel 106 may further comprise contact zone 102 and extraction zone 104. Contact zone 102 may comprise various features which will be described in detail below which may promote mixing and distribution of liquids before the liquids enter extraction zone 104. Extraction zone 104 may comprise various features which may promote liquid-liquid contact to effectuate mass transfer, chemical reactions, or both.

In some embodiments, extraction zone 104 may comprise one or more fiber bundles 108. Although only one fiber bundle 108 is illustrated, one of ordinary skill in the art will appreciate that any number of fiber bundles may be present. Additionally, without limitation, the fiber bundles may be arranged in series, parallel, series and parallel, or any other configuration. Fiber bundle 108 may comprise elongated fibers that extend from or below contact zone 102 through extraction zone 104. Fiber bundle 108 may promote contact between the liquids introduced into vessel 106 by allowing a first liquid to flow along individual fibers of fiber bundle 108 and a second liquid to flow between the individual fibers. In some embodiments, the fibers of fiber bundle 108 may be metallic or non-metallic. Any suitable fibers may be used for fiber bundle 108, including, but not limited to glass, fiberglass, rayon, nylon, polyesters, polyolefins, polytetrafluoroethylene, steel, aluminum, tungsten, nickel, and combinations thereof. In some embodiments, the fiber bundle may comprise metal fibers.

Each of the embodiments described herein may generally operate by the same physical phenomena. Two immiscible liquids may be individually introduced into vessel 106 through first inlet 110 and second inlet 112 and flow through contact zone 102 into extraction zone 104. In some embodiments, a first liquid introduced through first inlet 110 may be relatively light, or less dense, than a second liquid introduced through second inlet 112. The features present in contact zone 102 may promote mixing of the two immiscible liquids before the liquids flow into extraction zone 104. As one of ordinary skill in the art will appreciate, mixing of the two liquids may increase the effective surface area of extraction zone 104 which in turn may reduce the required length of extraction zone 104, decrease pressure drop across liquid-liquid mass transfer device 100, reduce material costs, reduce operations costs, and other benefits readily apparent to those of ordinary skill in the art.

Fiber-bundle type liquid-liquid mass transfer device 100 may be used to effectuate mass transfer between any fluids that require mass transfer. In some embodiments, fiber-bundle type liquid-liquid mass transfer device 100 may be used in caustic treatment, amine treatment, or acid treatment processes for example. Although only a few select processes and fluids will be described herein, it will be readily apparent to those of ordinary skill in the art that there may be other potential applications for fiber-bundle type liquid-liquid mass transfer device 100 that are not described. One of ordinary skill in the art, with the benefit of this disclosure should be able to adapt fiber-bundle type liquid-liquid mass transfer device 100 to any number of applications not explicitly enumerated herein.

In an embodiment, fiber-bundle type liquid-liquid mass transfer device 100 may be used in a caustic treatment application whereby a hydrocarbon feed and a caustic feed are introduced into fiber-bundle type liquid-liquid mass transfer device 100. The hydrocarbon feed and the caustic feed may be contacted such that impurities in the hydrocarbon feed react with the caustic feed to reduce the amount of impurities in the hydrocarbon feed. Some common impurities that may be removed may include carbon dioxide, organic acids such as carboxylic acids, mercaptans, also known as thiols, as well as hydrogen sulfide, carbonyl sulfide, and other common sulfur impurities found in hydrocarbon streams. The caustic feed may comprise water and a caustic agent such as sodium hydroxide, potassium hydroxide, or other compounds that release a hydroxide ion when added to water. The caustic treatment process may be appropriate for treatment of any hydrocarbon feed including, but not limited to, hydrocarbons such as alkanes, alkenes, alkynes, and aromatics, for example. The hydrocarbons may comprise hydrocarbons of any chain length, for example, from about C3 to about C30, or greater, and may comprise any amount of branching. Some exemplary hydrocarbon feeds may include, but are not limited to, crude oil, propane, LPG, butane, light naphtha, isomerate, heavy naphtha, reformate, jet fuel, kerosene, diesel oil, hydro treated distillate, heavy vacuum gas oil, light vacuum gas oil, gas oil, coker gas oil, alkylates, fuel oils, light cycle oils, and combinations thereof.

Another application of fiber-bundle type liquid-liquid mass transfer device 100 may be in an amine treatment application whereby a hydrocarbon feed and an amine feed are introduced into fiber-bundle type liquid-liquid mass transfer device 100. The hydrocarbon feed and the amine feed may be contacted such that impurities in the hydrocarbon feed react with the amine feed to reduce the amount of impurities in the hydrocarbon feed. Amine treatment may be used to remove contaminants that react with an amine such as hydrogen sulfide and carbon dioxide, for example. The hydrocarbon feed may be any hydrocarbon feed as described above. In an amine application, the amine feed may comprise water, for example, and an amine such as diethanolamine, monoethanolamine, methyldiethanolamine, diisopropanolamine, aminoethoxyethanol, and diglycolamine.

Figure 2:
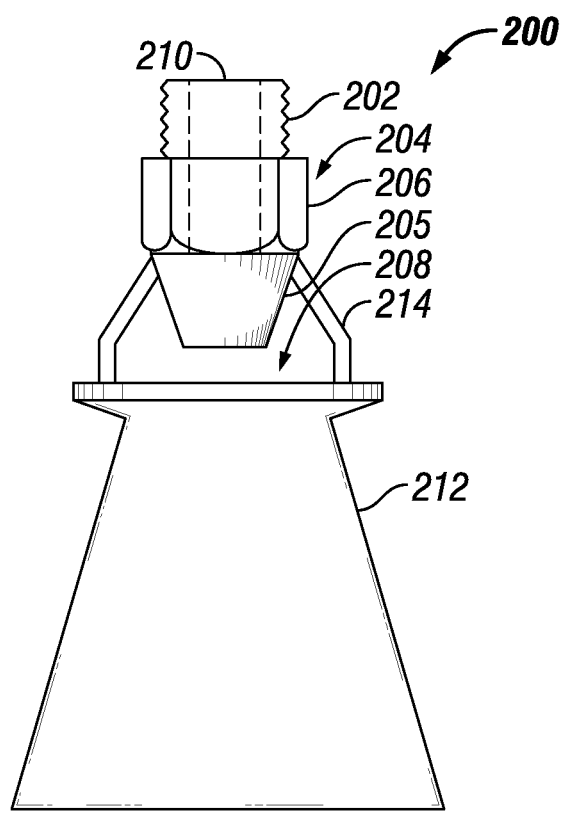
FIG. 2 is a schematic diagram of an inductor.

FIG. 2 illustrates an embodiment of an inductor 200 which may be disposed in contact zone 102. Inductor 200 may comprise coupling 202 which may be fluidically coupled to second inlet 112 (e.g., illustrated on FIG. 1). Coupling 202 may be any type of coupling including, but not limited to, screw threads, push fittings, flanged fittings, or any other coupling type to attach inductor 200 to second inlet 112. Inductor 200 may comprise a first reducer 204 comprising reducer body 206 and reducer cone 205. First reducer 204 may be attached to coupling 202 by reducer body 206. A flow path 210 may be defined within coupling 202 and reducer body 206 to allow a fluid to flow from second inlet 112, through flow path 210, and into reducer cone 205. Reducer cone 205 may increase the velocity of a fluid from flow path 210 and expel the fluid into induction zone 208, thereby causing a decrease in pressure in induction zone 208. As illustrated, reducer cone 205 may have a reduced cross-section for fluid flow as fluid traverse through reducer cone 205 from reducer body 206 to induction zone 208. Fluid in induction zone 208 may thereafter flow into second reducer cone 212. Second reducer cone 212 may be attached, for example, to reducer body 206 by attachment point 214. As will be described in greater detail below, low pressure caused by a first fluid flowing into induction zone 208 from reducer cone 205 may draw in a second fluid present in vessel 106 (e.g., illustrated on FIG. 1) into second reducer cone 212. Second reducer 212 cone may comprise any cone angle appropriate for a particular application. For example, second reducer cone 212 may comprise a cone angle between about 10° to about 40°.

Figure 3:
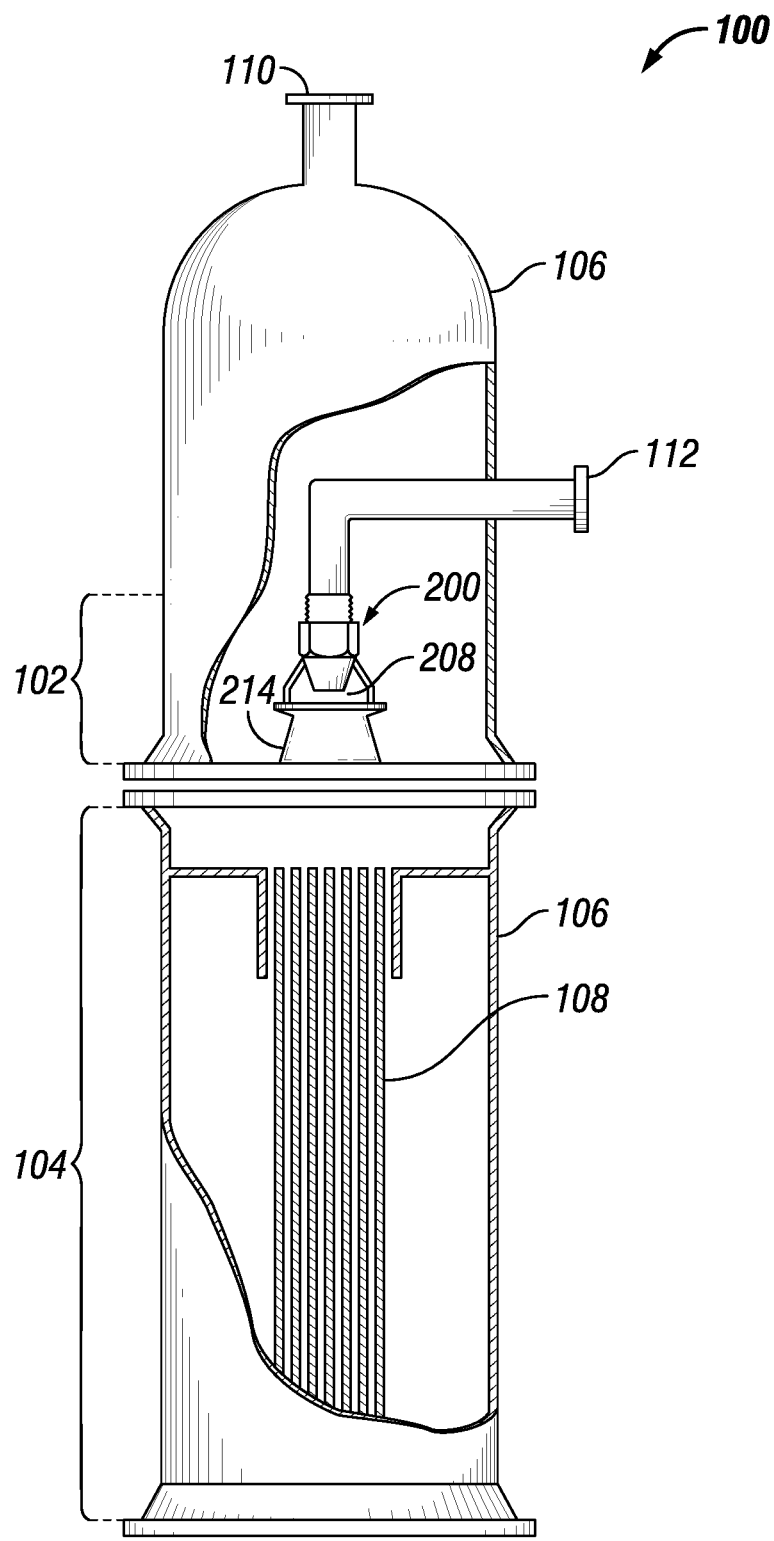
FIG. 3 is a schematic diagram of a liquid-liquid mass transfer device comprising an inductor.

FIG. 3 illustrates, in schematic form, an embodiment of a fiber-bundle type liquid-liquid mass transfer device 100 with inductor 200 disposed in contact zone 102. A first liquid and a second liquid may be introduced into vessel 106 through first inlet 110 and second inlet 112, respectively. As illustrated, inductor 200 may be coupled to second inlet 112. The first liquid introduced through inlet 110 may comprise, for example, the relatively lighter, or less dense fluid. The second fluid introduced through second inlet 112 may comprise the relatively heavier or denser fluid. As the second fluid flows through inductor 200, the first fluid present in vessel 106 may be drawn into a low pressure area (e.g., induction zone 208) created by inductor 200 and thereby mix and expel the first and second fluid together into extraction zone 104 through second reducer cone 212. The mixed first and second fluids may contact fiber bundle 108 which may promote contact between the two fluids as previously described.

Figure 4:
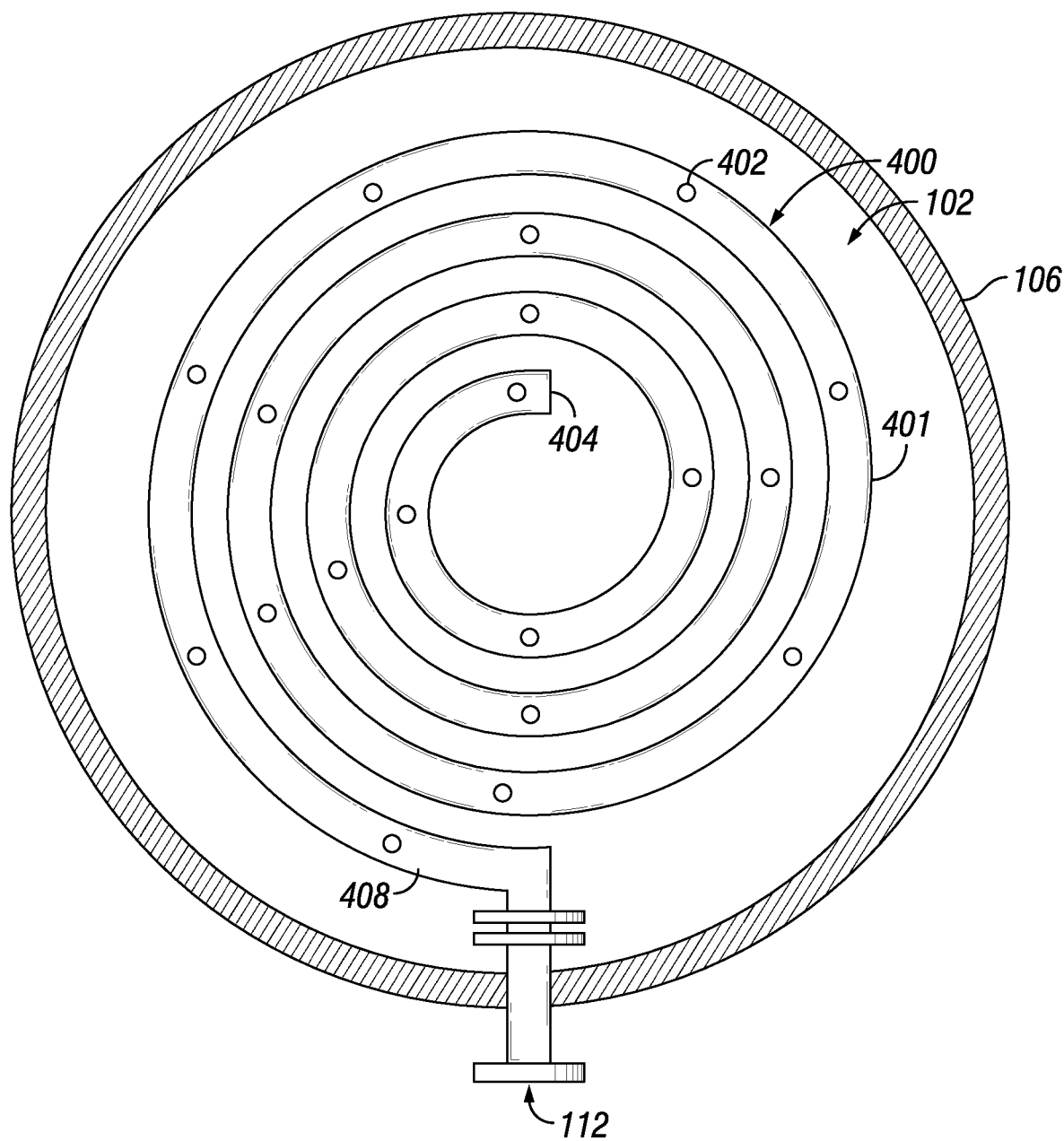
FIG. 4 is a cross-sectional view of a liquid-liquid mass transfer device with a spiral distributor disposed within mixing zone.

FIG. 4 is a cross-sectional view of an embodiment of a vessel 106 with spiral distributor 400 disposed within contact zone 102. In the illustrated embodiment, spiral distributor 400 may comprise a hollow tube 401 winding in a continuous and gradually tightening curve around a central point. Spiral distributor 400 may comprise a plurality of spaced apart holes 402 in hollow tube 401 to allow fluid in the hollow interior of spiral distributor 400 to flow into contact zone 102. A flow path 408 defined by the hollow interior of hollow tube 401 may fluidically link second inlet 112 to holes 402. Liquid from second inlet 112 may flow through flow path 408 to each of the plurality of holes 402 until the liquid reaches end cap 404. End cap 404 may seal off the end of spiral distributor 400 such that the fluid in flow path 408 can only exit spiral distributor 400 through holes 402. In some embodiments, fluid traversing through flow path 408 may exit spiral distributor 400 through holes 402 into contact zone 102. In another embodiment, a plurality of inductors 200 (e.g., illustrated in FIG. 2) may be individually attached or coupled to holes 402. In an embodiment where inductors 200 are present, fluid traversing flow path 408 may flow out of holes 402 and through inductor 200. Inductor 200 may be attached, or otherwise coupled, to holes 402 by any means, including, for example, screw threading, push fitting, or flanged. In some embodiments, an inductor 200 may be present in all of holes 402 or, alternatively, in only some of holes 402.

Referring now to FIG. 1 and FIG. 4, in an embodiment, spiral distributor 400 may be disposed within contact zone 102 of vessel 106 and be fluidically coupled to second inlet 112. As previously described, a first liquid and a second liquid may be introduced into vessel 106 through first inlet 110 and second inlet 112 respectively. The first liquid introduced through inlet 110 may comprise, for example, the relatively lighter, or less dense fluid. The second fluid introduced through second inlet 112 may comprise the relatively heavier or denser fluid. As the second fluid flows through spiral distributor 400, the second fluid may be expelled and dispersed into contact zone 102. The first fluid present in vessel 106, introduced through first inlet 110, may mix with the dispersed second fluid in contact zone 102 and the mixed first and second liquids may flow into extraction zone 104. The mixed first and second liquids may contact fiber bundle 108 which may promote contact between the mixed first and second liquids such that mass transfer, chemical reactions, or both may occur.

Referring now to FIGS. 1, 2, and 4, in an alternate embodiment, spiral distributor 400 may comprise inductors 200 disposed in at least some of holes 402 of spiral distributor 400 as previously described. In such an embodiment, the second fluid may flow through spiral distributor 400 and be expelled through inductors 200 disposed in at least some of the holes 402 of spiral distributor 400. The first liquid fluid present in vessel 106, introduced through first inlet 110, may be drawn into a low pressure area (e.g., induction zone 208) created by inductor 200 thereby mixing the first and second liquids and expelling the mixed fluids into extraction zone 104 by way of second reducer cone 212. The mixed first and second liquids may contact fiber bundle 108 which may promote contact between the mixed first and second liquids such that mass transfer, chemical reactions, or both may occur.

Figure 5:
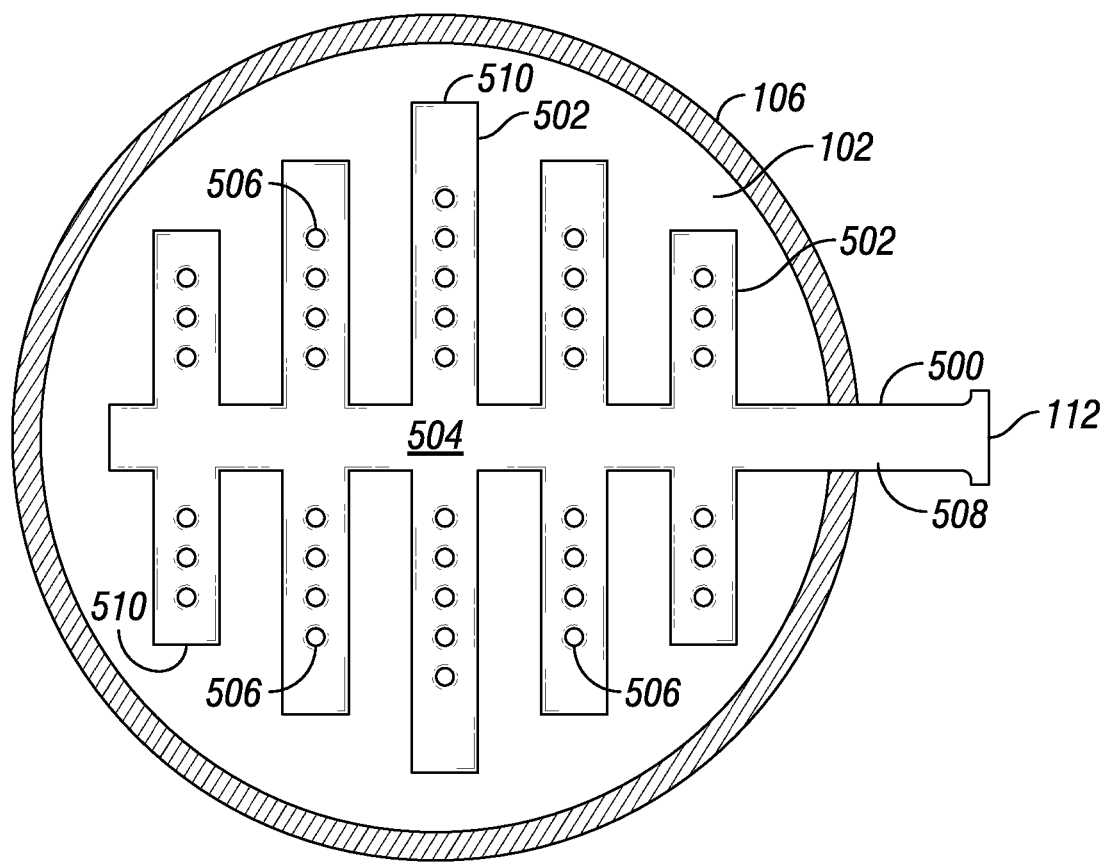
FIG. 5 is a cross-sectional view of a liquid-liquid mass transfer device with an arm distributor disposed within mixing zone.

FIG. 5 is a cross-sectional view of an embodiment of vessel 106 with arm distributor 500 disposed within contact zone 102. Arm distributor 500 may comprise a plurality of distributor arms 502 extending axially from a central tube 504. Arm distributor 500 may comprise any number of distributor arms 502, depending, for example, on required flow rate of fluid, among other factors. Each distributor arm 502 may comprise a plurality of holes 506 to allow fluid in the hollow interior of arm distributor 500 to flow into contact zone 102. A flow path 508 defined by the follow interior of arm distributor 500 may fluidically link second inlet 112 to holes 506. In some embodiments, liquid introduced through second inlet 112 may flow through flow path 508 into each distributor arm 502 and through each of the plurality of holes 506 until the liquid reached end cap 510. End cap 510 may seal off the ends of each distributor arm 502 such that fluid in flow path 508 can only exit through holes 506. In some embodiments, each of the plurality of holes 506 may have an inductor 200 (e.g., illustrated in FIG. 2) attached or coupled to holes 506. In an embodiment where inductors 200 are present, fluid traversing flow path 508 may flow out of holes 506 and through an inductor 200 disposed at an exit of holes 506. Inductor 200 may be attached, or otherwise coupled, to holes 506 by any means, including, for example, screw threading, push fitting, flanged. In some embodiments, an inductor 200 may be present in all of holes 506 or, alternatively, in only some of holes 506.

Referring now to FIGS. 1, 2, and 5, in an embodiment, arm distributor 500 may be disposed within contact zone 102 of vessel 106 and be fluidically coupled to second inlet 112. As previously described, a first liquid and a second liquid may be introduced into vessel 106 through first inlet 110 and second inlet 112 respectively. The first liquid introduced through first inlet 110 may comprise, for example, the relatively lighter, or less dense fluid. The second fluid introduced through second inlet 112 may comprise the relatively heavier or denser fluid. In some embodiments, as the second fluid flows through arm distributor 500, the second fluid may be expelled through inductors 200 disposed in at least some of the holes 506 of arm distributor 500. The first liquid fluid present in vessel 106, introduced through first inlet 110, may be drawn into a low pressure area (e.g., induction zone 208) created by inductor 200 thereby mixing the first and second liquids and expelling the mixed fluids into extraction zone 104 by way of second reducer cone 212. The mixed first and second liquids may contact fiber bundle 108 which may promote contact between the mixed first and second liquids such that mass transfer, chemical reactions, or both may occur.

Figure 6A:
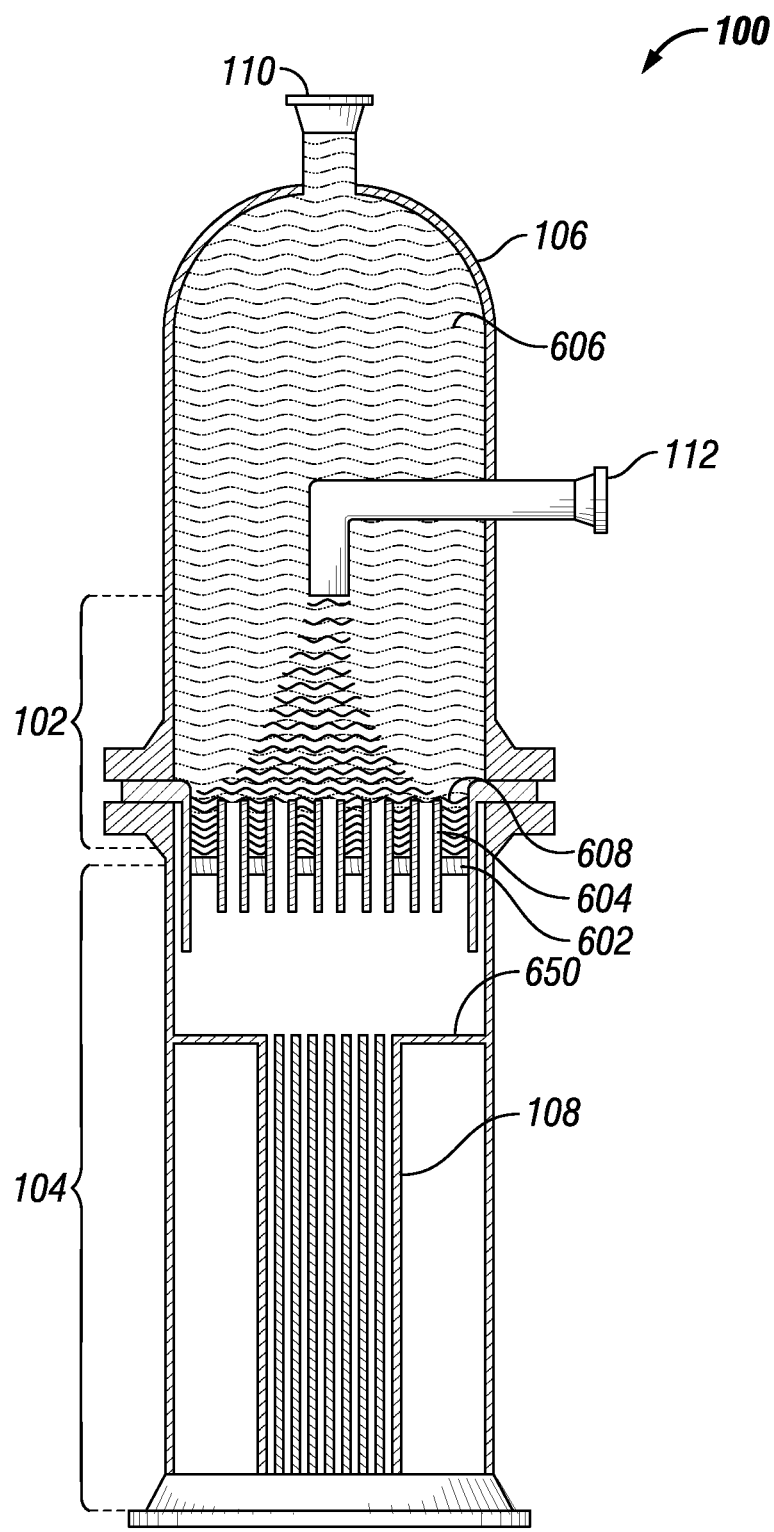
FIG. 6a is a schematic diagram of a liquid-liquid mass transfer device comprising a perforated plate assembly disposed in a mixing zone.

FIG. 6a illustrates, in schematic form, an embodiment of fiber-bundle type liquid-liquid mass transfer device 100 wherein a perforated plate assembly 602 comprising a plurality of chimneys 604 is disposed within contact zone 102. Chimneys 604 may be characterized by a riser pipe extending upwards from perforated plate. In some embodiments, chimney 604 may further include a downpipe which may extend downwards from the perforated plate and into extraction zone 104. Perforated plate assembly 602 may allow a first liquid layer 606 and a second liquid layer 608 to be in contact before flowing into extraction zone 104 comprising fiber bundle 108. First inlet 110 and second inlet 112 may allow a first liquid and a second liquid respectively into vessel 106 whereby the first and second liquid may flow through vessel 106 to perforated plate assembly 602 to form first liquid layer 606 and second liquid layer 608. As previously described, the first liquid may be the relatively lighter or less dense of the two liquids such that the first liquid forms first liquid layer 606 that floats on top of the second liquid forming second liquid layer 608. As will be described in further detail below, first liquid layer may overflow chimneys 604 into extraction zone 104 while second liquid layer 608 may flow through perforations (such as holes 610 illustrated in FIG. 6b) into extraction zone 104. In some embodiments, second inlet 112 may comprise an inductor 200 as illustrated in FIG. 3. Fiber bundle 108 may be affixed to a fiber support 650 below chimneys 604. Fiber support 650 may be spaced apart from perforated plate assembly 602 and may comprise any fiber support means such as metal rods, plates, or other mechanical mechanisms.

Figure 6B:
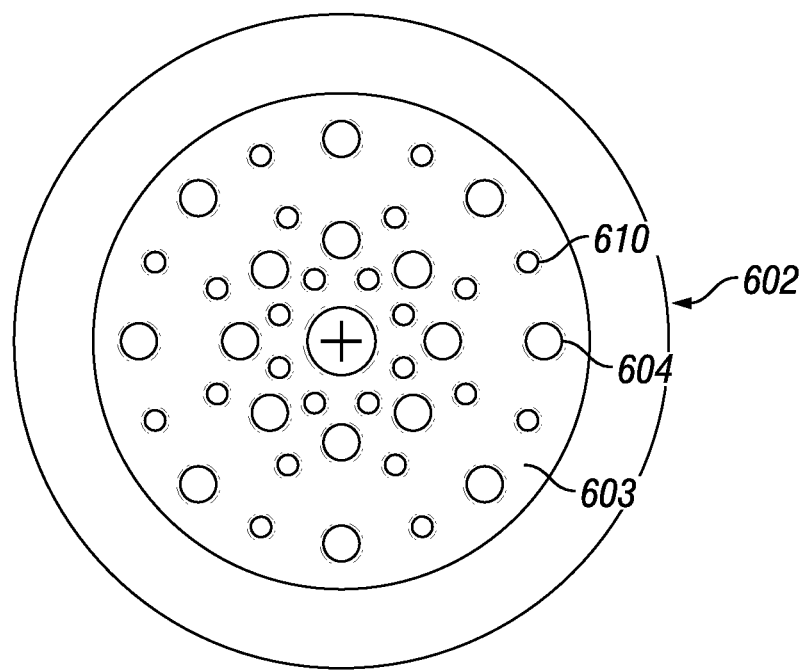
FIG. 6b is a top view of a perforated plate assembly.

FIG. 6b illustrates a top view of an embodiment of perforated plate assembly 602. Perforated plate assembly 602 may comprise a plate 603, plurality of chimneys 604 as described above as well, and a plurality of holes 610. In some embodiments, chimneys 604 may extend from plate 603, for example, axially way from plate 603, as shown on FIG. 6b. As illustrated, plurality of holes 610 may be formed in plate 603. Plurality of holes 610 may allow a second liquid layer 608 (illustrated in FIG. 6a) to flow into extraction zone 108. Any number and combination of holes and downpipes may be disposed on perforated plate assembly 602. For example, perforated plate assembly 602 may comprise at least one hole 610 and at least one chimney 604. The number of holes 610 and chimneys 604 may vary depending on many factors, including, but not limited to, required flow rates, size of holes, ratios of first liquid flow rate to second liquid flowrate, and other factors readily apparent to those of ordinary skill in the art. The number of holes and downpipes may vary from 1 to about 100 depending on the requirements above. Alternatively, the number of holes and downpipes may vary from 1 to about 25, 1 to about 50, 1 to about 75, or 1 to about 100. In embodiments, the arrangement of the holes may follow a pattern or be random. In some embodiments, holes 610 and chimneys 604 may form rows concentric circles whereby a first ring of holes 610 or chimneys 604 is followed by a second ring of holes 610 or chimneys 604, and so on. Alternatively, holes 610 and chimneys 604 may be arranged in a grid pattern, for example. In some embodiments, holes 610 and chimneys 604 may not have a pattern and may be arranged randomly on perforated plate assembly 602.

Figure 6C:
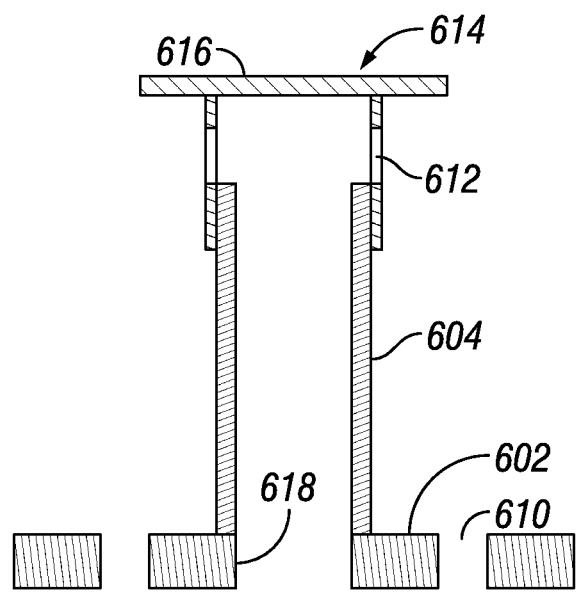
FIG. 6c is a side view of a perforated plate assembly.

FIG. 6c illustrates a side view of an embodiment of a portion of perforated plate assembly 602. In the illustrated, embodiment, perforated plate assembly 602 comprises holes 610 and chimney 604. Chimney 604 may optionally comprise hat 614 disposed on top of chimney 604. Hat 614 may comprise top 616 and openings 612 on the size of hat 614, such that a fluid communication may be established from outside of hat 614 to the inside of chimney 604. Hat 614, may comprise any number of openings 612. The particular number of openings in an embodiment of hat 614 may depend on many factors, including, but not limited to, required flow rate of fluid through openings 612. In some embodiments, hat 614 may comprise between 1 and about 10 openings. Hat 614 may be coupled to chimney 604 by any suitable means for example, by, threading, welding, fasteners, push fittings, and others readily apparent to those of ordinary skill in the art. Furthermore, perforated plate assembly 602 may comprise openings 618 over which chimney 604 may be positioned. As illustrated, chimney 604 is positioned on top of perforated plate assembly 602. However, in some embodiments, downpipe 604 may extend through perforated plate assembly 602. Chimney 604 may be coupled to perforated plate assembly by any fastening means, such as, for example, threading, welds, fasteners, push fittings, and other means readily apparent to those of ordinary skill in the art. By disposing hat 614 on chimney 604, hat 614 may prevent the first fluid layer 606, illustrated in FIG. 6a, from flooding through chimney 604. In embodiments where chimney 604 comprises hat 614, first liquid may flow through openings 612 and into mixing zone 102 as illustrated in FIG. 6a.

Figure 7:
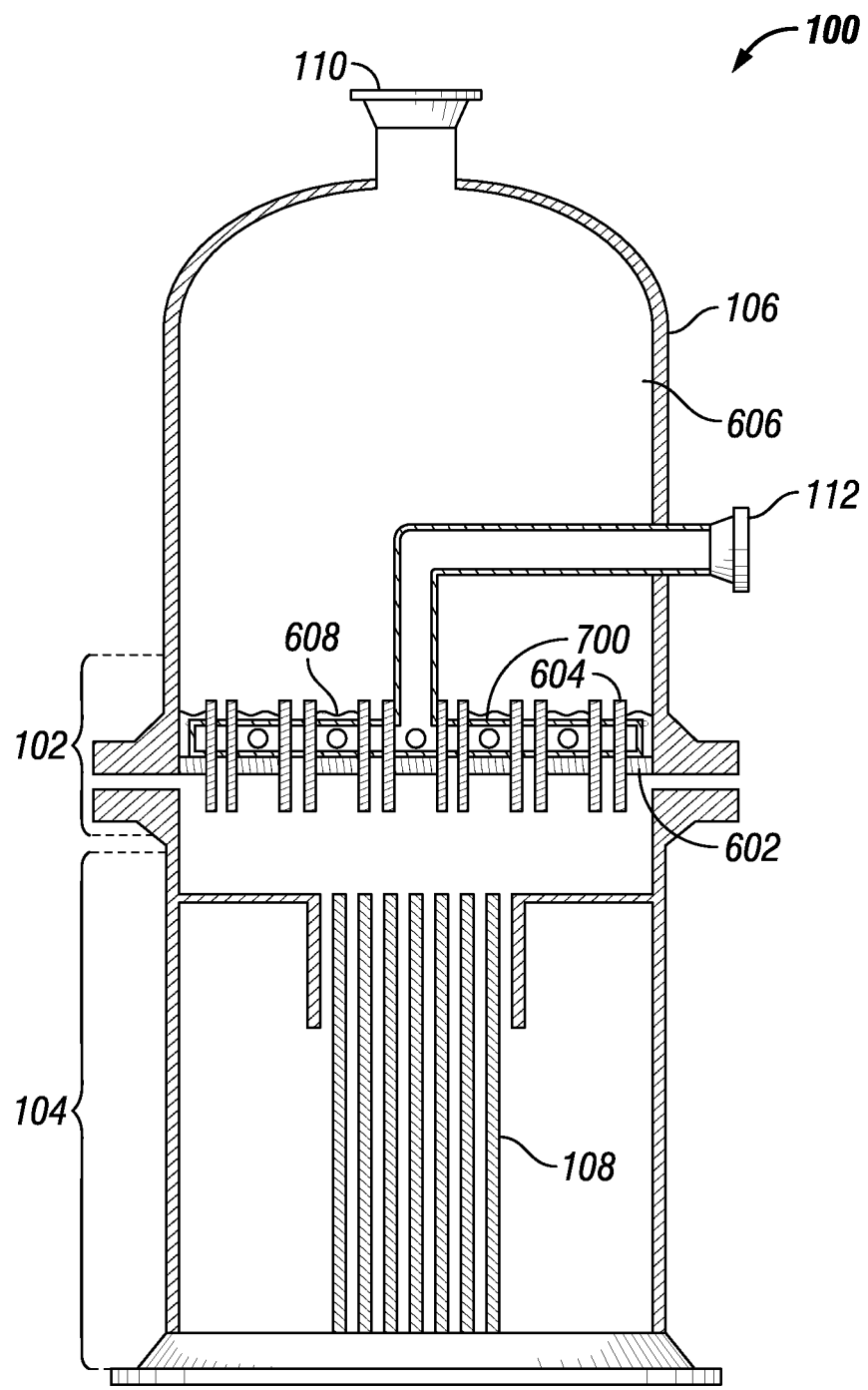
FIG. 7 is a schematic diagram of a liquid-liquid mass transfer device comprising a perforated plate assembly disposed in a mixing zone with a distributor.

FIG. 7 illustrates, in schematic form, an embodiment of fiber-bundle type liquid-liquid mass transfer device 100 wherein a perforated plate assembly 602 comprising a plurality of chimneys 604 is disposed within contact zone 102 and wherein the mixing zone further comprises a distributor 700. In the illustrated embodiment, distributor 700 is disposed within second liquid layer 608, previously described above. Distributor 700 may be fluidically coupled to second inlet 112 and provide a flow path for second liquid entering second inlet 112 to flow into contact zone 102. Distributor 700 may be any of the previously described distributors, including spiral distributor 400 illustrated in FIG. 4 or arm distributor 500 illustrated in FIG. 5. In some embodiments, distributor 700 may further comprise inductor 200 as illustrated in FIG. 2 and previously described as an embodiment of spiral distributor 400 and arm distributor 500.

Perforated plate assembly 602 may allow a first liquid layer 606 and a second liquid layer 608 to be in contact before flowing into extraction zone 104 comprising fiber bundle 108. First inlet 110 and may allow first liquid to flow into vessel 106 and form first liquid layer 606. Second inlet 112 may be fluidically coupled to distributor 700 which may allow second liquid to form second liquid layer 608 within contact zone 102. As previously described, the first liquid may be the relatively lighter or less dense of the two liquids such that the first liquid forms first liquid layer 606 that floats on top of the second liquid forming second liquid layer 608. First liquid layer may overflow chimneys 604 into extraction zone 104 while second liquid layer 608 may flow through perforations (such as holes 610 illustrated in FIG. 6b) into extraction zone 104. FIG. 7 illustrates first liquid layer 606 and a second liquid layer 608 as two distinct layers for illustrative purposes. However, due to splashing and other movement of fluids associated with transport of the first and second fluid into vessel 106, two distinct layers of fluid may not be formed. In some embodiments, a mixture of the first liquid and the second liquid may be present. In either example, the first and second liquids may flow into extraction zone 104 and contact fiber bundle 108. Fiber bundle 108 may promote contact between the first and second liquids such that mass transfer, chemical reactions, or both may occur.

Figure 8:
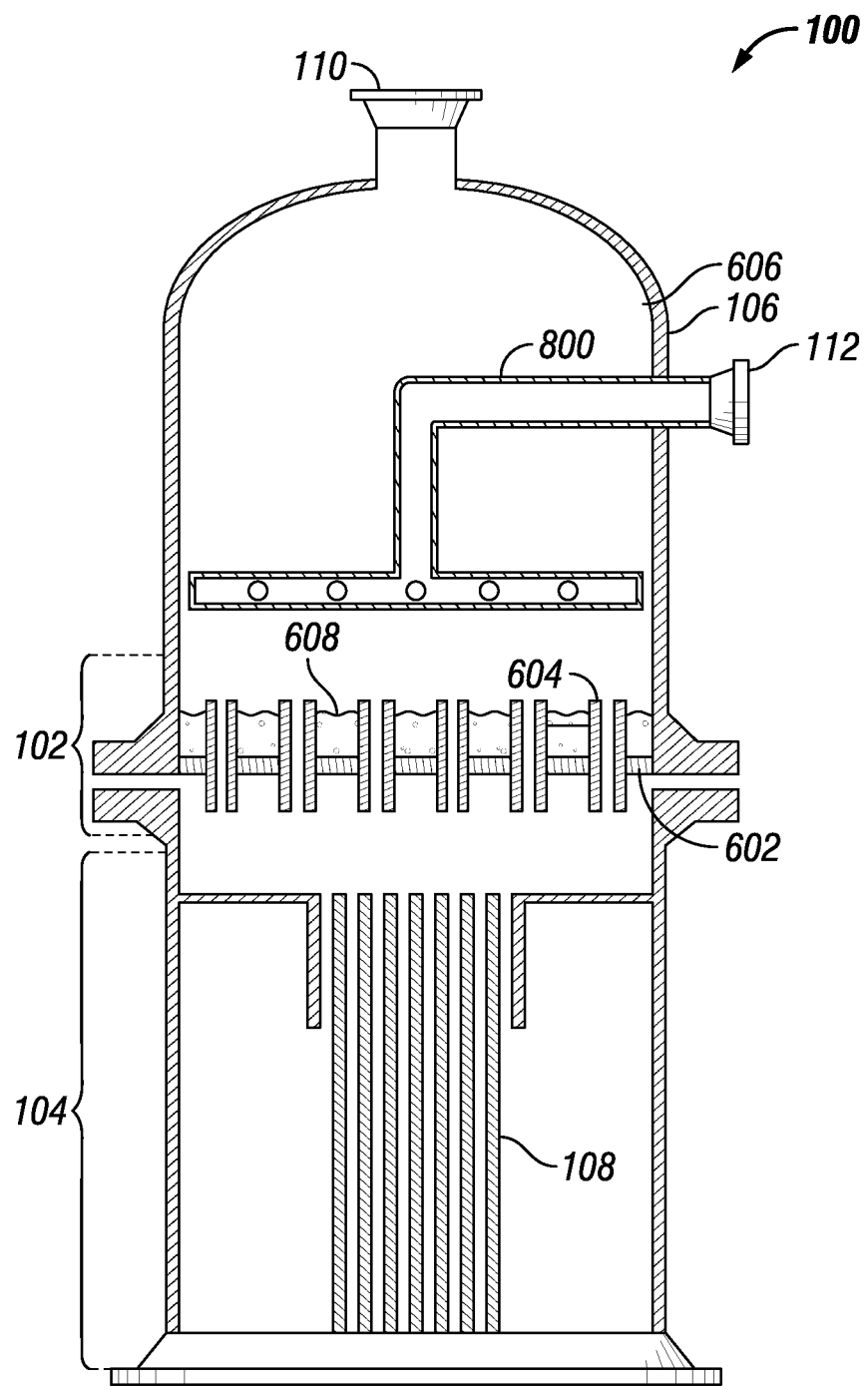
FIG. 8 is a schematic diagram of a liquid-liquid mass transfer device comprising a perforated plate assembly disposed in a mixing zone with a distributor.

FIG. 8 illustrates, in schematic form, an embodiment of fiber-bundle type liquid-liquid mass transfer device 100 wherein a perforated plate assembly 602 comprising a plurality of chimneys 604 is disposed within contact zone 102 and wherein the mixing zone further comprises a distributor 700 disposed above first liquid 606 and second liquid 608. Distributor 700 may be fluidically coupled to second inlet 112 and provide a flow path for second liquid entering second inlet 112 to flow into contact zone 102. Distributor 700 may be any of the previously described distributors, including spiral distributor 400 illustrated in FIG. 4 or arm distributor 500 illustrated in FIG. 5. In some embodiments, distributor 700 may further comprise inductor 200 as illustrated in FIG. 2 and previously described as an embodiment of spiral distributor 400 and arm distributor 500.

Perforated plate assembly 602 may allow a first liquid layer 606 and a second liquid layer 608 to be in contact before flowing into extraction zone 104 comprising fiber bundle 108. First inlet 110 and may allow first liquid to flow into vessel 106 and form first liquid layer 606. Second inlet 112 may be fluidically coupled to distributor 700 which may allow second liquid to form second liquid layer 608 within contact zone 102. As previously described, the first liquid may be the relatively lighter or less dense of the two liquids such that the first liquid forms first liquid layer 606 that floats on top of the second liquid forming second liquid layer 608. First liquid layer may overflow chimneys 604 into extraction zone 104 while second liquid layer 608 may flow through perforations (such as holes 610 illustrated in FIG. 6b) into extraction zone 104. FIG. 7 illustrates first liquid layer 606 and a second liquid layer 608 as two distinct layers for illustrative purposes. However, due to splashing and other movement of fluids associated with transport of the first and second fluid into vessel 106, two distinct layers of fluid may not be formed. In some embodiments, a mixture of the first liquid and the second liquid may be present. In either example, the first and second liquids may flow into extraction zone 104 and contact fiber bundle 108. Fiber bundle 108 may promote contact between the first and second liquids such that mass transfer, chemical reactions, or both may occur.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A fiber bundle contactor comprising:
   a vessel comprising:
      a first inlet;
      a second inlet;
      a mixing zone arranged in the vessel to receive a first fluid from the first inlet and a second fluid from the second inlet, wherein the mixing zone comprises a perforated plate assembly comprising a plate, a plurality of openings in the plate, and a plurality of riser pipes that extend from the plate and are arranged to allow fluid flow through additional openings in the plate; and
      an extraction zone comprising a fiber bundle arranged in the vessel to receive the first fluid and the second fluid from the mixing zone.

2. The fiber bundle contactor of claim 1 further comprising a distributor coupled to the second inlet wherein the distributor comprises a spiral distributor or an arm distributor.

3. The fiber bundle contactor of claim 2 wherein the distributor comprises a plurality of spaced apart holes and a flow path from the second inlet to the plurality of spaced apart holes.

4. The fiber bundle contactor of claim 3 further comprising an inductor fluidically coupled to at least one of the plurality of spaced apart holes.

5. The fiber bundle contactor of claim 4 wherein the inductor comprises:
   a reducer body with a flow path disposed therein and fluidically coupled to the second inlet; a first reducer cone disposed on the reducer body such that the flow path disposed in the reducer body extends through the first reducer cone; and
   a second reducer cone, wherein the second reducer cone is spaced apart from an outlet of the first reducer cone.

6. The fiber bundle contactor of claim 2 wherein the distributor is disposed within a standing liquid on the plate or above a standing liquid on the plate.

7. A fiber bundle contactor comprising:
   a plate comprising a plurality of openings;
   one or more riser pipes extending from the plate, the riser pipe providing fluid communication through the plate by way of at least one of the openings;
   a distributor disposed above the plate; and
   a fiber bundle attached to and depending from a fiber support, wherein the plate and the fiber support are separated, wherein the fiber bundle is disposed below the plate, and wherein the fiber bundle is arranged to receive a fluid from the plurality of openings.

8. The fiber bundle contactor of claim 7 wherein the plate comprises 2 to 50 openings.

9. The fiber bundle contactor of claim 7 wherein the fiber bundle contactor comprises more than one of the riser pipes.

10. The fiber bundle contactor of claim 7 comprising 2 to 25 riser pipes.

11. The fiber bundle contactor of claim 7 wherein the one or more riser pipes extend through the plate.

12. The fiber bundle contactor of claim 7 wherein the one or more riser pipes comprises a riser pipe which comprises a hat, the hat comprising openings providing fluid communication into an interior of the riser pipe.

13. The fiber bundle contactor of claim 7 further comprising a first inlet and a second inlet wherein the first inlet configured to convey a first fluid to a first location above the plate and the second inlet is configured to convey a second fluid to a second location above the plate.

14. A method comprising:
introducing into a vessel a first fluid from a first inlet and a second fluid from a second inlet;
contacting the first fluid and the second fluid in a mixing zone within the vessel, wherein the mixing zone comprises:
a plate comprising a plurality of openings; and
a riser pipe extending from the plate, the riser pipe providing fluid communication through the plate by way of at least one of the openings;
flowing the first fluid and the second fluid through the plurality of openings to an extraction zone; and
contacting the first fluid and the second fluid in the extraction zone, wherein the extraction zone comprises:
a fiber bundle arranged in the vessel to receive the first fluid and the second fluid from the mixing zone.

15. The method of claim 14 wherein the first fluid is a hydrocarbon fluid and the second fluid is an aqueous fluid.

16. The method of claim 15 wherein the second fluid is introduced into the vessel at a point closer in proximity to the plate than the first fluid.

17. The method of claim 16 wherein the second fluid is introduced at a rate such that a standing liquid layer comprising the second fluid is formed on the plate.

18. The method of claim 14 wherein the first fluid and the second fluid, flow to the extraction zone through the riser pipe.

19. The method of claim 14 wherein the plate comprises 2 to 50 openings.

20. The method of claim 14 wherein the plate comprises 2 to 25 riser pipes.

* * * * *